B. HIMELFARB.
HAND IMPLEMENT.
APPLICATION FILED JUNE 29, 1918.
1,427,898.
Patented Sept. 5, 1922.
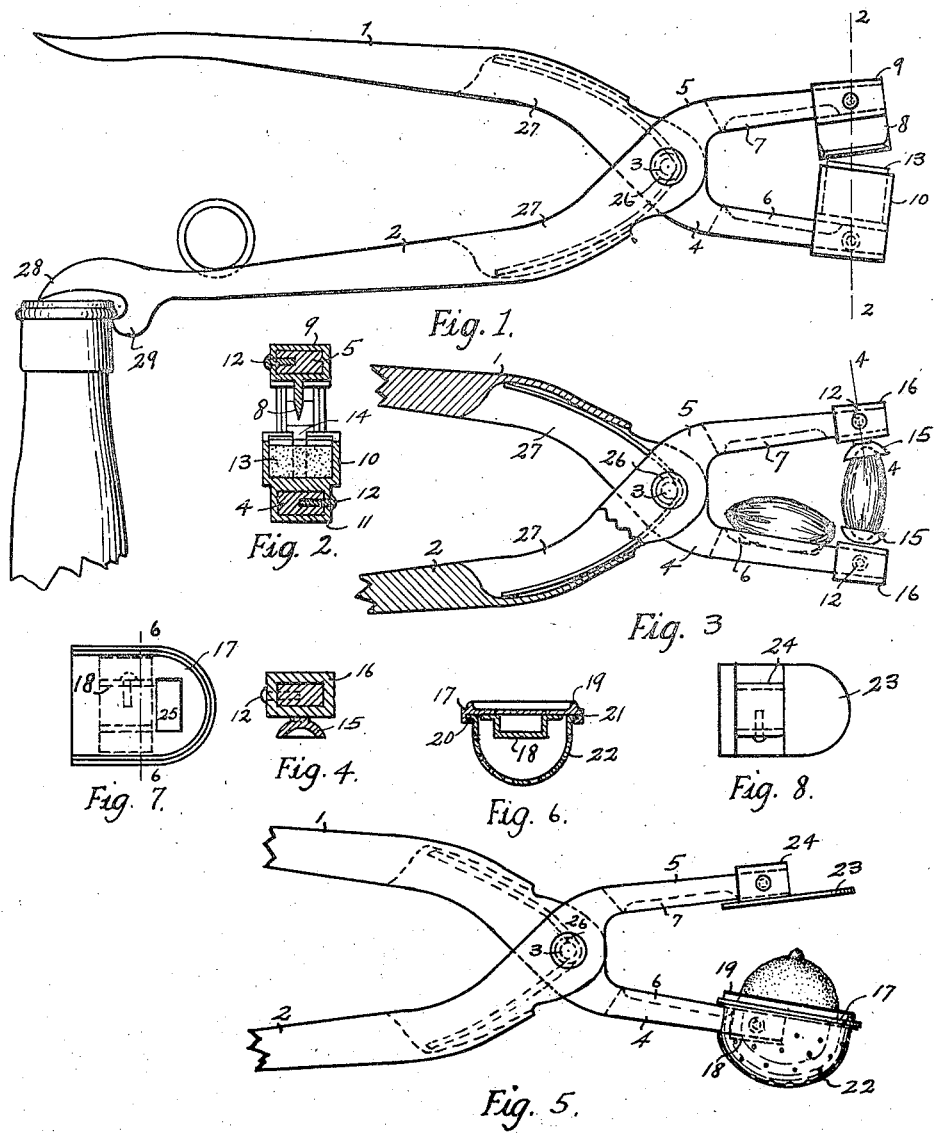
INVENTOR
Benjamin Himelfarb
BY
Hardway Carter
ATTORNEYS Patented Sept. 5, 1922.

1,427,898

UNITED STATES PATENT OFFICE.

BENJAMIN HIMELFARB, OF HOUSTON, TEXAS.

HAND IMPLEMENT.

Application filed June 29, 1918. Serial No. 242,619.

*To all whom it may concern:*

Be it known that BENJAMIN HIMELFARB, a subject of the Government of Russia, residing at Houston, in the county of Harris and State of Texas, has invented certain new and useful Improvements in a Hand Implement, of which the following is a specification.

This invention relates to new and useful improvements in a hand implement.

The object of the invention is to provide a manually operated implement, designed to be used for various domestic purposes as will be more specifically set forth hereinafter in this specification.

With the above and other objects in view, the invention has particular relation to certain novel features of construction, operation and use, an example of which is given in this specification, and illustrated in the accompanying drawings, wherein:

Figure 1, is a side elevation of the complete device.

Figure 2, is a transverse sectional view, taken on the line 2—2, of Figure 1.

Figure 3, is a fragmentary view, partially in section, showing another form of the device.

Figure 4, is a transverse, sectional view, taken on the line 4—4 of Figure 3.

Figure 5, is a fragmentary side view of still another form of the device.

Figure 6, is a sectional view, taken on the line 6—6 of Figure 7.

Figure 7, is a top plan view of the container, employed in the form shown in Figure 5, showing the strainer removed, and Figure 8, is a plan view of the clamping member, employed in Figure 5.

Referring now more particularly to the drawings, wherein like numerals of reference designate similar parts in each of the figures, the numerals 1 and 2 refer, respectively, to the handle members, of the implement, which are pivotedly secured together by means of the pin 3, which passes through suitable bearings in said handles. The respective handles are extended forming the lower and upper jaws 4 and 5, whose inner sides are provided with oblong recesses 6 and 7, respectively, forming retainers, for an object placed between said jaws, such as a nut, when it is desired to use the implement as a nutcracker, as illustrated in Figure 3.

The form of implement shown in Figure 1, has been specially designed for use in severing cubes of sugar into parts. In this form, the numeral 8 designates a blade, which is provided with a collar 9, of a form to receive the jaw 5, and the numeral 10 designates a receptacle, having the collar 11, of a form designed to receive the jaw 4. The collars 9 and 11, are secured to the respective jaws by means of pins 12, 12, which pass through orifices therein and project into aligned recesses in the corresponding jaws. The receptacle 10 is of a size and form to receive a sugar cube 13, and said receptacle is provided with aligned slots, as 14, to receive the blade 8. It is obvious that when the handles 1, 2, are forced, together, the blade 8 will operate to sever the object placed in the receptacle 10.

In Figure 3, I have shown a form of the device, particularly adapted for use as a nut cracker. The nut to be cracked may be placed in the recess 6, of the lower jaw, and the upper jaw then clamped there against. When used for this purpose, I have also provided the shallow cups 15, 15, having the respective collars 16, 16, formed integral therewith, to receive the respective jaws 4 and 5, and which are secured thereto by means of the pins 12, 12 as above explained. As is obvious, from inspection, of Figure 3, these cups are provided to receive the ends of the nut to be cracked, and to hold the same in position through the operation.

In Figure 5, I have shown a form of the device, especially adapted for use as a lemon squeezer, or other similar purposes. In this form, the numeral 17, refers to a shallow receptacle, whose underside has a collar 18, provided to receive the end of the jaw 4, and which is secured to said jaw in a manner hereinbefore explained. This container has a flat upper surface, and the surrounding upstanding marginal flange 19, integral therewith. The underside of said container has a marginal groove 20, provided to receive the marginal flange 21, of the strainer 22. This strainer is formed of perforated material, and is cup like in form, and is made removable from the container 17, so as to be readily cleansed. A clamping member 23, is provided which has a collar 24, integral therewith, designed to receive the free end of the jaw 5, and which is secured thereto in the manner hereinbefore explained. The lemon is cut in two and the flat side thereof, placed on the container 17, and through the manipulation of the handles 1 and 2, the member 23 is clamped there against, the fluid passing through an opening 25, cut through the bottom of said container and thence through the strainer 22.

The implement is held open, that is, the jaws thereof are normally held apart by means of a spring 26, which is coiled around the pin 3, and whose free ends are extended, and lie in long recesses 27, 27, provided in the inner sides of the handles 1 and 2.

As shown in Figure 2, the free end of the handle 2 is formed into a cap remover, consisting of the claw 28, which engages against the top of the cap to be removed, and the hook 29, provided to engage under the rim of said cap.

What I claim is:

A device of the character described including a pair of handles pivotally connected together and extended one way to form grips, and the other way to form co-operating jaws, a receptacle carried by one jaw and provided to receive objects, the opposite walls of said receptacle having aligned blade receiving slots, and a blade carried by the other jaw and provided to work through said slots and sever the object in said receptacle.

In testimony whereof he has signed his name to this specification in the presence of two subscribing witnesses.

BENJAMIN HIMELFARB.

Witnesses:
E. V. HARDWAY,
IRENE BRUNS.